T. F. BARSBY.
MOTOR VEHICLE.
APPLICATION FILED JUNE 6, 1916.
1,276,709.
Patented Aug. 27, 1918.
FIG. 1
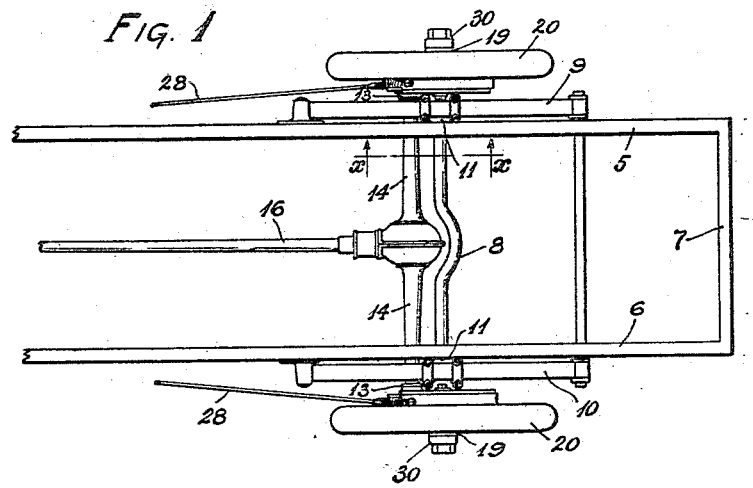
FIG. 2
FIG. 3
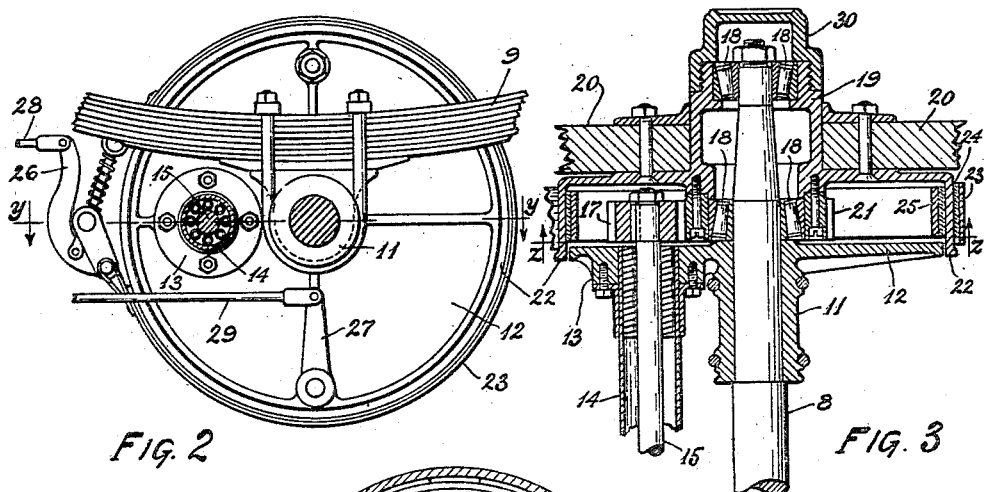
FIG. 4
WITNESS
OJohnson
INVENTOR
Thomas Fredrick Barsby
BY
C.S.Haskins
ATTORNEY

UNITED STATES PATENT OFFICE.

THOMAS FREDRICK BARSBY, OF SEATTLE, WASHINGTON, ASSIGNOR, BY MESNE ASSIGNMENTS, TO UNIVERSITY GARAGE COMPANY, OF SEATTLE, WASHINGTON, A CORPORATION.

MOTOR-VEHICLE.

1,276,709.   Specification of Letters Patent.   Patented Aug. 27, 1918.

Application filed June 6, 1916.  Serial No. 102,103.

*To all whom it may concern:*

Be it known that I, THOMAS FREDRICK BARSBY, citizen of the United States, residing at Seattle, in the county of King and State of Washington, have invented a certain new and useful Improvement in Motor-Vehicles, of which the following is a specification.

My invention relates to improvements in motor vehicles, and the object of my invention is to provide operative mechanism that may be added to the chassis of a passenger automobile of a common type and be associated with the driving shaft thereof, whereby such automobile may be converted into a freight carrying motor truck that will travel at a much slower speed in response to a given number of revolutions per minute of its driving shaft.

I accomplish this object by devices illustrated in the accompanying drawings wherein Figure 1 is a plan view of a structure embodying my invention; Fig. 2 is a fragmentary view of the same on a larger scale in vertical section on broken line $x$, $x$ of Fig. 1; Fig. 3 is a view of the same in horizontal section on broken line $y$, $y$ of Fig. 2; and Fig. 4 is a sectional view of parts of the same on broken line $z$, $z$ of Fig. 3.

Referring to the drawings, throughout which like reference numerals designate like parts, 5 and 6 are side rails and 7 is an end rail of a frame that is adapted to be spliced to the rear end portion of the side rails of the chassis of an automobile from which the rear wheels and bearings thereof have been removed.

Secured in a well known manner to the outer side of each of the side rails 5 and 6 is a carriage spring, as springs 9 and 10 respectively, the central portion of each of which springs 9 and 10 is clamped in a well known manner to an adjacent one of hubs 11 each of which is rigidly secured to an adjacent part of one of the opposite end portions of an axle 8 which is transversely disposed beneath the side rails 5 and 6, as shown in Fig. 1.

On the outer end of each of the hubs 11 is concentrically disposed a disk 12 that is integral therewith.

Each of the disks 12 is provided with a boss 13 within which is concentrically disposed to extend therethrough one of the end portions of one of two transversely disposed tubes 14 which are rigidly united to form a shaft housing, within each of which tubes 14 is disposed a shaft, as the shaft 15, which is connected at one of its ends with a differential gearing that is associated with the driving shaft 16 of the automobile, while its other end portion extends through the respective one of the bosses 13 to project outwardly through its disk 12 and mounted securely on such outwardly projecting end portion of each of said shafts 15 is a pinion 17, as shown more clearly in Figs. 3 and 4.

Rotatably mounted on roller bearings 18 on each of the opposite end portions of the axle 8 adjacent to the respective one of the disks 12 is the hub 19 of an automobile wheel 20 and securely mounted on the inwardly projecting portion of said hub 19 is a gearwheel 21 whose teeth operatively engage with the teeth of the pinion 17, as more clearly shown in Figs. 3 and 4.

The inner side of each of the wheel hubs 19 is provided with a concentrically disposed integral flange 22 whose outer cylindrical surface is surrounded with a brake band 23, of well known form, which is provided with a frictional lining 24, in the usual manner, and within said flange 22 is a brake ring 25, also of well known form, which is secured to the adjacent disk 12 in a well known manner; both the external brake band 23 and the internal brake ring 25 being adapted to be actuated independently by levers 26 and 27, respectively, in response to endwise movements of brake-rods 28 and 29 respectively as indicated in Fig. 2.

The outer end portion of each of the hubs 19 is provided with a removable cap 30 which serves to exclude dirt and dust from the roller bearings within the hub 19.

To convert a passenger automobile of a common type, as, for instance, a Ford automobile, into a motor truck designed to travel at a slower speed, it is only necessary to substitute in place of its rearward running gear and its rearward side springs, the structure illustrated in Figs. 1, 2, 3, and 4 hereinbefore described, by attaching the side rails 5 and 6 of said structure to the rearward portion of the chassis of the automobile whereby said chassis will be lengthened in a rearward direction to serve as a support for the floor of a motor truck adapted to carry freight; the driving shaft 16 being extended to the engine to be driven thereby.

The rotation of the shaft 16 will communicate motion in an obvious manner to the shafts 15 thereby to rotate the pinion 17 which will cause the gearwheel 21 to rotate the automobile wheels 20 much more slowly than the shafts 15.

Obviously, changes may be made in the forms, dimensions and arrangement of parts of my invention without departing from the spirit thereof.

What I claim is:

In an automobile of the class described, a fixed rear axle, an automobile wheel rotatably mounted on each of the opposite end portions of said axle, a gear wheel having outer peripheral teeth and mounted securely on and against the inner end of the hub of each of said wheels, a flanged disk formed integral with each of the hubs of said wheels in a position with its flange encircling the adjacent one of said gear wheels, a separate disk provided with an integral circumferentially grooved hub rigidly mounted on each end portion of said axle in a position adjacent to the inner side of said gear wheels, a separate carriage spring rigidly secured to the hub of each of said last-named disks by means of clamping members seated in the circumferential grooves of said disk hub, a chassis whose rearwardly extended portion is connected to both of said springs, tubular shaft housings rigidly connected to and extending between said last-named disks, two independently rotatable shafts disposed end to end in said shaft housings, each with its outer end projected outwardly through the adjacent one of said last-named disks, a pinion securely mounted on the outwardly projecting end of each of said two shafts in a position to mesh with the adjacent one of said gear wheels, and means for communicating rotary motion to said two shafts.

In witness whereof I hereunto subscribe my name this 22nd day of May, A. D. 1916.

THOMAS FREDRICK BARSBY.

Witnesses:
 FRANK WARREN,
 O. JOHNSON.

Copies of this patent may be obtained for five cents each, by addressing the "Commissioner of Patents, Washington, D. C."